United States Patent [19]

Pryba

[11] Patent Number: 5,799,546
[45] Date of Patent: Sep. 1, 1998

[54] COMPACT ROLLER FOLLOWER

[75] Inventor: Stanley J. Pryba, Toledo, Ohio

[73] Assignee: Henley Manufacturing Holding Company, Inc., Hampton, N.H.

[21] Appl. No.: 504,238

[22] Filed: Jul. 19, 1995

[51] Int. Cl.[6] .................................................. F16H 53/06
[52] U.S. Cl. ........................ 74/569; 74/55; 123/90.39; 123/90.44
[58] Field of Search ................... 74/55, 567, 569; 123/90.39, 90.4, 90.41, 90.42, 90.43, 90.44, 90.45, 90.46, 90.47, 90.51; 29/881.2; 72/379.2

[56] References Cited

U.S. PATENT DOCUMENTS

| | | | |
|---|---|---|---|
| 4,430,783 | 2/1984 | Wherry | 29/888.2 |
| 4,624,223 | 11/1986 | Wherry et al. | 129/90.44 |
| 4,697,473 | 10/1987 | Patel | 123/90.39 X |
| 4,825,717 | 5/1989 | Mills | 123/90.39 X |
| 4,995,281 | 2/1991 | Allor et al. | 74/569 X |

FOREIGN PATENT DOCUMENTS

| | | | |
|---|---|---|---|
| 1169542 | 2/1962 | Germany | 29/630 |
| 405272310 | 10/1993 | Japan | 123/90.39 |

*Primary Examiner*—Charles A. Marmor
*Assistant Examiner*—Saúl Rodriguez

[57] ABSTRACT

A compact roller follower has a one-piece, cold-formed elongate metal body. The body has an intermediate portion, a first end portion, and a second end portion. The intermediate portion has two substantially parallel side walls and a large, elongate upper opening. The first end portion has a top wall and two side walls extending downwardly therefrom and spaced closer together than the parallel side walls of the intermediate portion. The first end portion forms a generally inverted U-shaped recess to receive an end of a valve stem. The second end portion has a second top wall and side walls extending downwardly therefrom. The end of the second top wall has a tongue which is doubled back underneath the second top wall. An upper surface of the tongue is in contiguous relationship with a lower surface of the second top wall and forms a recess to receive an upper end of a lifter post above a lifter post body. The second end portion of the roller follower is above the lifter post body for all positions of the roller follower. This enables the second end portion of the roller follower to be narrower since it need not straddle the lifter post body.

12 Claims, 2 Drawing Sheets

COMPACT ROLLER FOLLOWER

BACKGROUND OF THE INVENTION

Field of the Invention

This invention relates to a compact roller follower having a one-piece, cold-formed body.

The roller follower in accordance with the invention has a one-piece metal body made by cold-forming operations including stamping, coining, and back-packing. The metal body is elongate and of generally inverted U-shaped cross section throughout most of its length with top wall portions and structurally-integral side walls depending therefrom. The roller follower includes an intermediate portion and two end portions. The intermediate portion has substantially parallel side walls with a large, generally rectangular opening at the top. The parallel side walls have aligned holes therein with an axle received therethrough and a roller rotatably mounted.

The second end portion of the roller follower body has two downwardly-extending side walls which are structurally-integral with the corresponding top wall. A central portion of this top wall has a downwardly-facing recess therein with an opening extending upwardly.

SUMMARY OF THE INVENTION

In accordance with the invention, a structurally-integral tongue extends outwardly from the end of the top wall of the second end portion and is doubled back under and formed with a downwardly-facing recess along with the corresponding top wall. The recess in the tongue receives a rounded end of a lifter post. This recess is shallower so as to engage the rounded end of the lifter post and still retain the roller follower along with the corresponding side walls above the body of the lifter post. Consequently, the second end of the roller follower can be narrower than otherwise, which is an important consideration where space is at a premium. This is particularly true for multivalve cylinders of internal combustion engines. The doubled top wall of the second end portion of the roller follower also enables the follower to be stiffer.

It is, therefore, a principal object of the invention to provide a roller follower having a one-piece, cold-formed body with a narrower end for engaging a lifter post.

Other objects and advantages of the invention will be apparent from the following detailed description of a preferred embodiment thereof, reference being made to the accompanying drawings, which:

DESCRIPTION OF THE PREFERRED EMBODIMENTS

Figure 1:
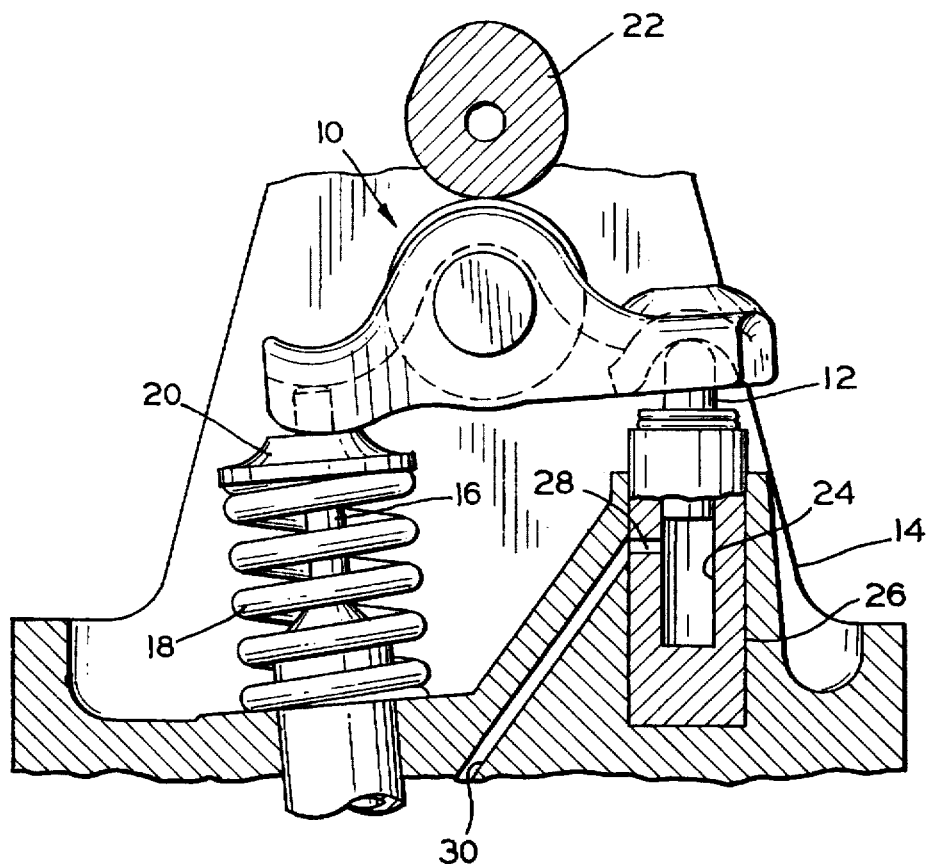
FIG. 1 is a somewhat schematic view in cross section, with parts in elevation, of valve actuating mechanism, including a roller follower in accordance with the invention.
Figure 2:
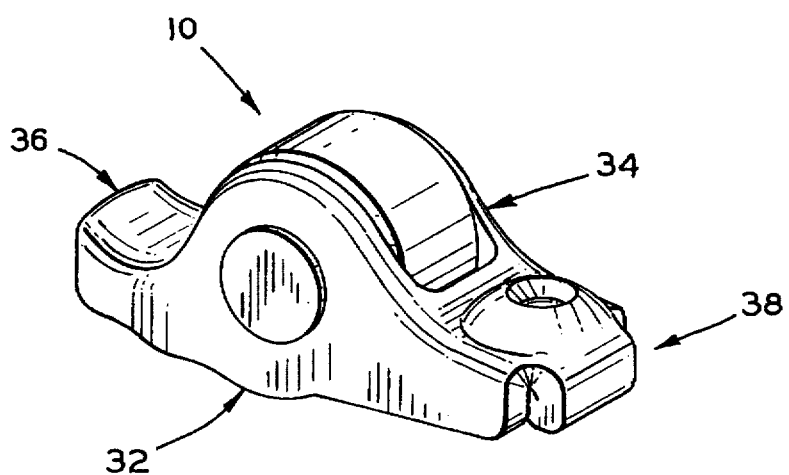
FIG. 2 is a view in perspective of the roller follower of FIG. 1.
Figure 3:
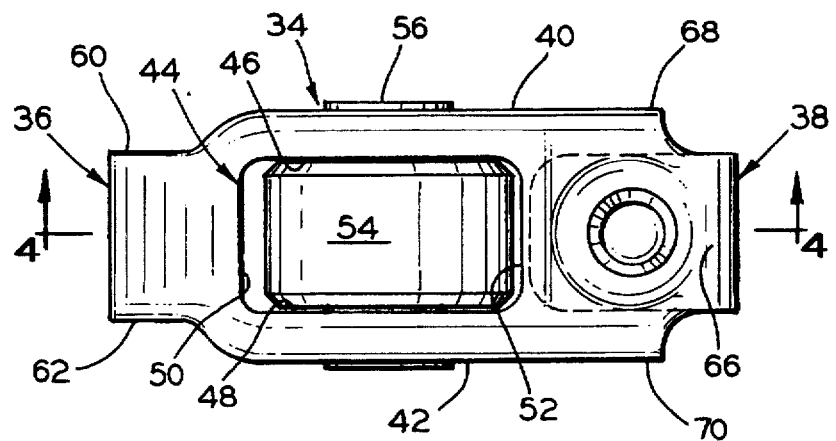
FIG. 3 is a top view of the roller follower of FIG. 2.

Referring particularly to FIGS. 1 and 2, a roller follower is indicated at 10 and has one end portion received on a fulcrum or lifter post 12 extending upwardly from a cylinder head 14 of an internal combustion engine. Another end portion of the roller follower engages an upper end of a valve stem 16. The valve stem extends upwardly from the cylinder head through a coiled compression spring 18 located therearound and which is seated against the cylinder head and against a retainer ring 20 mounted on the valve stem 16. An overhead cam 22 engages an intermediate portion of the roller follower 10 to cause a valve (not shown) located at the lower end of the valve stem 16 to open and close as the stem is moved longitudinally by the roller follower 10 as it is caused to pivot by the cam.

The lifter post 12 is slidably carried in a chamber 24 of a cylinder 26. The post is urged upwardly by oil under pressure in the chamber 24 which is supplied through a small port 28 from a supply passage 30. The post 12 can yield somewhat when the cam 22 rotates, with the post moving downwardly slightly at the high lobe of the cam 22 to provide a zero lash adjustment for the roller follower. The port 28 is of a size to provide for controlled leakage of the oil from the chamber 24 to control the oil pressure therein. Oil can also be supplied from the passage 30 through a passage (not shown) in the lifter post 12 and up to the roller follower 10 for lubricating purposes.

Referring more particularly to FIGS. 2–6, the roller follower 10 includes a one-piece, cold-formed metal body 32 which is preferably made by cold-forming operations including stamping, coining, and back-packing. The roller follower body includes an intermediate portion 34, a first end portion 36, and a second end portion 38.

The intermediate portion of the roller follower body has two substantially parallel side walls 40 and 42 and a large, generally rectangular opening 44 with substantially straight, parallel side edges 46 and 48 located at the upper edges of the side walls 40 and 42 and with slightly rounded end edges 50 and 52.

The intermediate portion 34 of the roller follower 10 rotatably carries a cam-contacting roller 54 which is exposed at the opening 44 and contacts the overhead cam 22. This causes the roller follower to pivot on the post 12 when the cam 22 rotates. The cam-contacting roller also enables the overall roller follower to have a lower height, with the combination of the low profile and compactness enabling the roller follower to be particularly adaptable for smaller engines and those with lower profile including lower profile valve trains. The use of the roller also minimizes friction between the cam and the roller follower which reduces loads and results in better fuel economy or higher performances, as well as reduced wear. The roller 54 is rotatably mounted on an axle 56, preferably with needle bearings (not shown) therebetween. The axle extends through two aligned circular holes in the side walls 40 and 42 with the outer ends of the axles being flared to hold the axle in position. This is known in the art, as disclosed, for example, in U.S. Pat. No. 5,048,475, issued on Sep. 17, 1991.

The first end portion 36 of the roller follower has an upper or top wall 58 and two downwardly-extending side walls 60 and 62. The side walls and integral with the top wall and are spaced closer together than the side walls 40 and 42 of the intermediate portion 34. The top wall 58 forms a pad 64 which is just slightly wider than the valve stem 16 to help maintain the roller follower in a lateral position relative to the engine valve stem.

The second end portion 38 of the roller follower has a top wall 66 and side walls 68 and 70 which are essentially extensions of the side walls 40 and 42, respectively, of the intermediate portion 34. The top wall 66 has a downwardly-facing shallow recess 72 and a central hole 74 therein. The hole 74 is to facilitate shaping of the end 38 of the roller follower.

Figure 4:
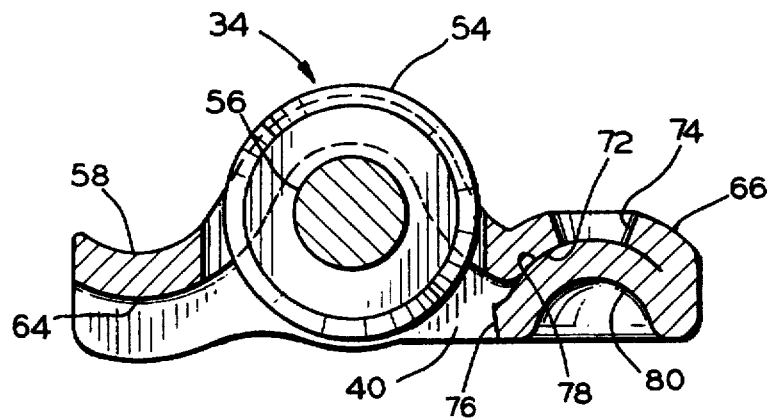
FIG. 4 is a view in longitudinal cross section taken along the line 4—4 of FIG. 3.
Figure 6:
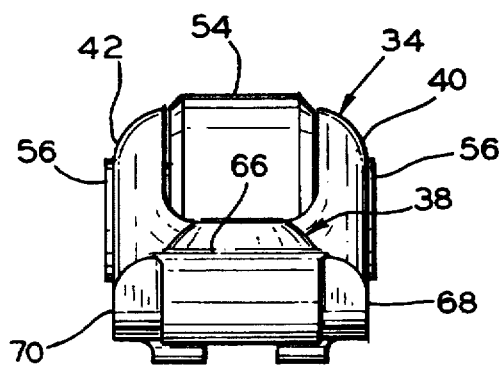
FIG. 6 is a right-end view of the roller follower.
Figure 5:
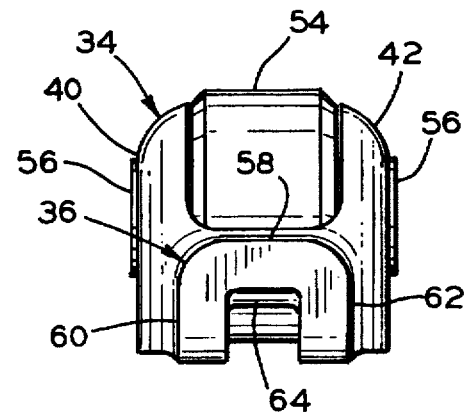
FIG. 5 is a left-end view of the roller follower.

In accordance with the invention, a tongue 76 is structurally integral with the end of the top wall 66 and is doubled back thereunder, as best shown in FIG. 4. The tongue has a width which is slightly less than the distance between the inner surface of the side walls 68 and 70. The tongue 76 has an upper surface 78 which is contiguous with the recess 72 of the top wall 66. A downwardly-facing recess 80 is formed in the tongue 76 to receive the top of the lifter post 12. Since the recess 80 is located near the lower edges of the side walls 68 and 70, the roller follower body 32 will clear the body of the lifter post 12 for all positions of the roller follower. This enables the overall roller follower 10 to be narrower than otherwise necessary, which is particularly important when space is at a premium. The tongue 76 also contributes to the overall stiffness of the roller follower 10.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A compact roller follower comprising a one-piece, cold-formed, elongate metal body having an intermediate portion, a first end portion, and a second end portion, said intermediate portion having two substantially parallel side walls and a large elongate upper opening, said first end portion having a top wall and two side walls extending downwardly therefrom and being spaced closer together than said parallel side walls of said intermediate portion, said first end portion forming a generally inverted U-shaped recess to receive an end of a valve stem, said second end portion having a second top wall and side walls extending downwardly therefrom, an outer end of said second top wall having a tongue which is doubled back underneath said second top wall, an upper surface of said tongue being in contiguous relationship with a lower surface of said second top wall and forming a recess to receive an upper end of a lifter post above a lifter post body, said second end portion of said compact roller follower being above said lifter post body for all positions of said compact roller follower.

2. A compact roller follower according to claim 1 wherein said tongue has a width which is slightly less than the distance between the inner surface of the side walls of said second portion.

3. A compact roller follower according to claim 1 wherein said tongue has a length extending back substantially to said large elongate upper opening.

4. A compact roller follower according to claim 1 wherein said tongue has a thickness substantially equal to the thickness of said second top wall.

5. A compact roller follower comprising a one-piece, cold-formed, elongate metal body having an intermediate portion, a first end portion, and a second end portion, said intermediate portion having two substantially parallel side walls and a large elongate upper opening, said parallel side walls having aligned circular openings therein, an axle extending through said circular openings, and a roller rotatably mounted on said axle and extending above said elongate upper opening, said first end portion having a top wall and two side walls extending downwardly therefrom, said first end portion forming a generally inverted U-shaped recess to receive an end of a valve stem, said second end portion having a second top wall and side walls extending downwardly therefrom, said second top wall having an additional wall underneath said second top wall, an upper surface of said additional top wall being in contiguous relationship with a lower surface of said second top wall and forming a recess to receive an upper end of a lifter post above a lifter post body, said second end portion of said compact roller follower being above said lifter post body for all positions of said compact roller follower.

6. A compact roller follower according to claim 5 wherein said additional wall has a width which is slightly less than the distance between the inner surface of the side walls of said second portion.

7. A compact roller follower according to claim 5 wherein said additional wall has a length extending back substantially to said large elongate upper opening.

8. A compact roller follower according to claim 5 wherein said additional top wall has a thickness substantially equal to the thickness of said second top wall.

9. A compact roller follower comprising a one-piece, cold-formed, elongate metal body having an intermediate portion, a first end portion, and a second end portion, said intermediate portion having two substantially parallel side walls and a large elongate upper opening, said parallel side walls having aligned circular openings therein, an axle extending through said circular openings, and a roller rotatably mounted on said axle and extending above said elongate upper opening, said first end portion having a top wall and top side walls extending downwardly therefrom and being spaced closer together than said parallel side walls of said intermediate portion, said first end portion forming a generally inverted U-shaped recess to receive an end of a valve stem, said second end portion having a second top wall and side walls extending downwardly therefrom, an outer end of said second top wall having a tongue which is doubled back underneath said second top wall, an upper surface of said tongue being in contiguous relationship with a lower surface of said second top wall and forming a recess to receive an upper end of a lifter post above a lifter post body, said second end portion of said compact roller follower being above said lifter post body for all positions of said compact roller follower.

10. A compact roller follower according to claim 9 wherein said tongue has a width substantially equal to the distance between the inner surfaces of the side walls of said second portion, said tongue having a thickness substantially equal to the thickness of said second top wall, and said tongue having a length extending back near said elongate upper opening.

11. A compact roller follower according to claim 9 wherein said tongue has a width which is slightly less than the distance between the inner surface of the side walls of said second portion.

12. A compact roller follower according to claim 9 wherein said tongue has a thickness substantially equal to the thickness of said second top wall.

* * * * *